United States Patent
Lore et al.

(10) Patent No.: US 8,480,355 B2
(45) Date of Patent: Jul. 9, 2013

(54) NACELLE COMPRISING AT LEAST ONE SURGE TRAP

(75) Inventors: Xavier Raymond Yves Lore, Beuzeville la Grenier (FR); Pascal-Marie Paul Marcel Soulier, Le Havre (FR); Aurelie De Sorbay, Le Havre (FR); Thierry Jacques Albert Le Docte, Le Havre (FR)

(73) Assignee: Aircelle, Gonfreville l'Orcher (FR)

( * ) Notice: Subject to any disclaimer, the term of this patent is extended or adjusted under 35 U.S.C. 154(b) by 811 days.

(21) Appl. No.: 12/674,015

(22) PCT Filed: Jul. 23, 2008

(86) PCT No.: PCT/FR2008/001091
§ 371 (c)(1),
(2), (4) Date: Feb. 18, 2010

(87) PCT Pub. No.: WO2009/047399
PCT Pub. Date: Apr. 16, 2009

(65) Prior Publication Data
US 2011/0171014 A1    Jul. 14, 2011

(30) Foreign Application Priority Data
Aug. 20, 2007    (FR) .................................... 07 05936

(51) Int. Cl.
*F01D 11/00*    (2006.01)

(52) U.S. Cl.
USPC ......... 415/126; 415/144; 415/201; 415/213.1

(58) Field of Classification Search
USPC ................................ 415/126, 144, 201, 203.1
See application file for complete search history.

(56) References Cited

U.S. PATENT DOCUMENTS

| 2,698,149 | A | * | 12/1954 | Greenwood et al. | ........... 244/113 |
| 3,638,428 | A | * | 2/1972 | Shipley et al. | ............... 60/226.1 |
| 4,825,644 | A |  | 5/1989 | Bubello | |
| 5,119,625 | A | * | 6/1992 | Glowacki | ..................... 60/226.3 |

FOREIGN PATENT DOCUMENTS
FR    2406729    5/1979

OTHER PUBLICATIONS

International Search Report PCT/FR2008/001091; Dated Mar. 13, 2009.

* cited by examiner

*Primary Examiner* — Ninh H Nguyen
(74) *Attorney, Agent, or Firm* — Brinks Hofer Gilson & Lione

(57) ABSTRACT

The invention relates to a nacelle for a turbojet engine, comprising a rear section forming an outer structure which defines, together with a concentric inner structure (4) comprising an inner panel (10) for surrounding a downstream part of the turbojet engine, an annular flow channel for a so-called secondary flow. The invention is characterized in that the exhaust means (11) are arranged in the inner panel in such a way that any inopportune surge is exhausted in the annular channel.

8 Claims, 3 Drawing Sheets

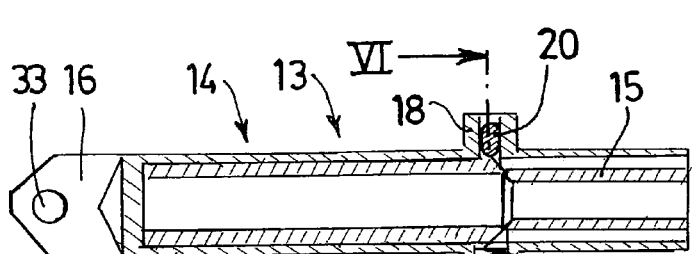 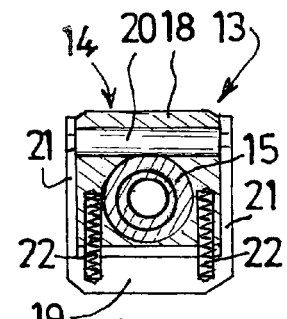
FIG. 5    FIG. 6
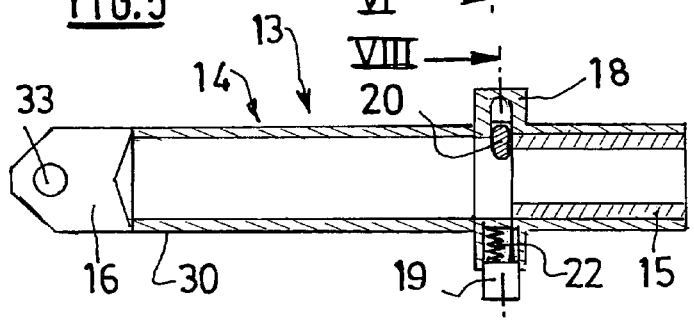 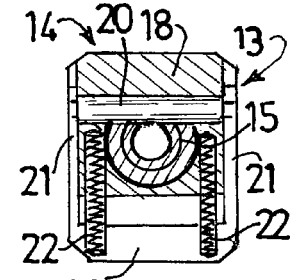
FIG. 7    FIG. 8
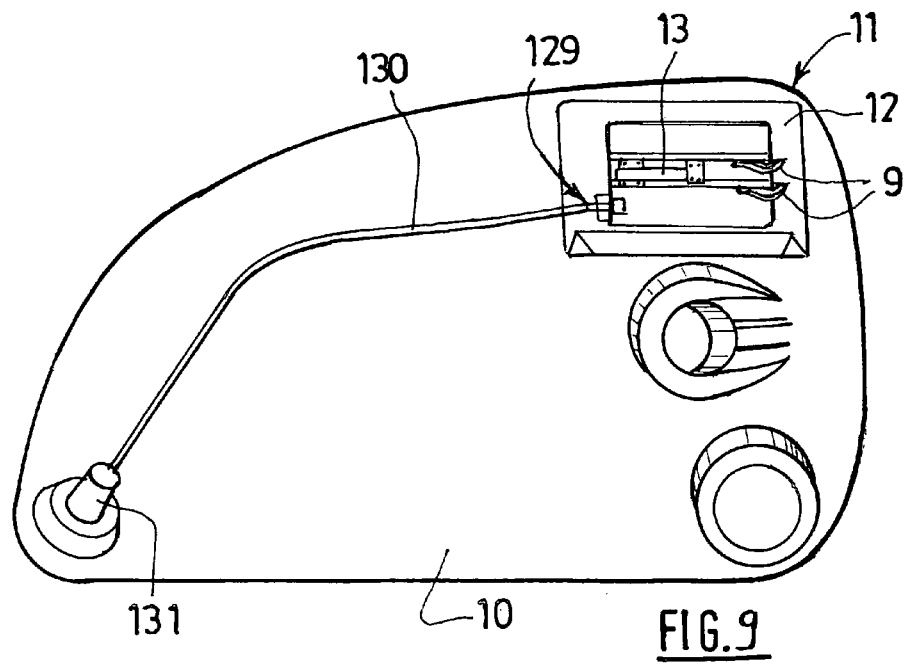
FIG. 9

NACELLE COMPRISING AT LEAST ONE SURGE TRAP

TECHNICAL FIELD

The invention relates to a jet engine nacelle for an aircraft.

BACKGROUND

An aircraft is propelled by a number of jet engines each housed in a nacelle which also accommodates a collection of auxiliary actuating devices associated with the operation thereof and performing various functions when the jet engine is operating or stationary. These auxiliary actuating devices particularly comprise a mechanical system for actuating thrust reversers.

A nacelle generally has a tubular structure comprising an air inlet in front of the jet engine, a mid-section intended to surround a fan of the jet engine, and a rear section accommodating thrust reversal means and intended to surround the combustion chamber of the jet engine, and is generally terminated by an exhaust nozzle whose outlet is situated downstream of the jet engine.

Modern nacelles are often intended to accommodate a turbofan jet engine designed, via the blades of the rotating fan, to generate a hot air stream (also known as primary stream) from the jet engine combustion chamber.

A nacelle generally has an outer structure, termed Outer Fixed Structure (OFS), which, together with a concentric inner structure, termed Inner Fixed Structure (IFS), comprising an inner panel surrounding the actual structure of the jet engine to the rear of the fan, defines an annular flow duct, also termed flow path aimed at channeling a cold air stream termed secondary steam, which flows around outside the jet engine. The primary and secondary streams are ejected from the jet engine via the rear of the nacelle.

Certain equipment of the jet engine conducts highly pressurized fluids. In the event of untimely breakage of this equipment, the inner panel is subjected to a high excess pressure which can lead as far as the destruction of a part of said panel and/or of the equipment housed in this environment. To avoid this destruction, it is commonly accepted to enter one or more excess pressure flaps in the rear part of the inner panel of the outer structure, at the outlet of the annular duct, the gas flow rate constituting the excess pressure then being theoretically discharged directly to the outside of the nacelle.

Nevertheless, the gas flow rate generated by the explosion produced in the jet engine compartment can be expelled only after having travelled the whole way to the nearest excess pressure flap. Now, it has been found in practice that this distance had the effect of greatly limiting the benefit of integrating such excess pressure flaps, insofar as the structure and/or the equipment could suffer before the excess pressure is discharged. In certain cases, it has even been found that these excess pressure flaps did not play any role.

It is known from document U.S. Pat. No. 4,825,644 to form exhaust means in the inner panel these exhaust means comprising at least one excess pressure flap equipped with spacing means for ensuring a minimum discharge flow rate to the outside in the event of unwanted excess pressure, said spacing means being produced with the aid of at least one strut equipped with locking means designed to lock said strut in its spacing position in the event of excess pressure requiring the opening of the excess pressure flap. Consequently, the unwanted excess pressure occurring in the jet engine compartment is immediately discharged inside the annular duct via the exhaust means, and cannot therefore cause the destruction of the inner panel and/or the surrounding equipment.

BRIEF SUMMARY

The present invention aims at providing an alternative solution and to that end comprises a nacelle for a jet engine, of the type comprising a rear section forming an outer structure which, together with a concentric inner structure comprising an inner panel intended to surround a downstream portion of the jet engine, defines an annular flow duct for a so-called secondary stream, said nacelle comprising exhaust means formed in the inner panel and comprising at least one excess pressure flap equipped with spacing means for guaranteeing a minimum discharge flow rate to the outside in the event of an untimely excess pressure, said spacing means being produced with the aid of at least one strut equipped with locking means designed to lock said strut in its spacing position in the event of excess pressure requiring the opening of the excess pressure flap, characterized in that the strut comprises a hollow casing in which a rod can slide, said casing having an end fixed in the excess pressure flap and said rod having an end fixed in the inner panel, in that the casing has a U-shaped outer shoulder, and in that the locking means are produced with the aid of a U-shaped insert which is slid into the outer shoulder and held in position by at least one retention finger housed in the casing and connecting the two free arms of said insert.

Advantageously, elastic return means are provided between the casing and the insert in such a way as to move said insert away from the outer shoulder when the rod has slid in the casing, thereby forcing the retention finger to position itself on the return path of said rod.

Preferably, the exhaust means are positioned at the front of the inner panel.

It should go without saying that another solution for reducing the potential risk of reclosure can also comprise the integration of means for braking the reclosure movement of the excess pressure flap, such that the latter can find its point of equilibrium.

Thus, in a nacelle according to the invention, the location of the excess pressure flap or flaps can be chosen to be as close as possible to the equipment of the jet engine which is likely to create the highest excess pressure, such that this or these excess pressure flap or flaps are capable of discharging this excess pressure without stressing the stiffness of the inner panel of the inner structure.

Specifically, the originality of the invention is to benefit from the very high local excess pressure in the vicinity of the point of the explosion in order to promote the immediate opening of the exhaust means, thereby finally allowing a quasi-instantaneous expulsion of the gases generated by the explosion. The risk of damaging the inner panel and/or the surrounding equipment is therefore considerably reduced.

The immediate advantages of such an installation are a weight and cost saving since given that the inner panel of the inner structure is no longer stressed by any unwanted excess pressure, there is no longer any need to dimension it so that it can withstand such stresses. Furthermore, aircraft manufacturers have more freedom as to the choice of the location of the excess pressure flap or flaps along the annular duct.

Given the position of these exhaust means, a nacelle according to the invention preferably comprises means designed so as to make the actuation of the exhaust means visible from the outside.

Advantageously, the detection means comprise a control system whose activation is conditioned by the activation of the exhaust means.

Advantageously still, the control system is connected to at least one external mechanical display member via transmission means.

Preferably, the control system comprises a pre-stress trigger, connected to the transmission means, the release of which is conditioned by the actuation of the exhaust means.

The present invention also relates to an aircraft comprising at least one nacelle according to the invention.

BRIEF DESCRIPTION OF THE DRAWINGS

The implementation of the invention will be better understood from the detailed description which is explained below with reference to the appended drawing, in which:

FIG. 5 is a partial view in longitudinal section of the retracted strut of the excess pressure flap represented in FIG. 4;

FIG. 6 is a cross-sectional view on the line VI-VI shown in FIG. 4;

FIG. 7 is a partial view in longitudinal section of the strut, when deployed, of the excess pressure flap represented in FIG. 4;

FIG. 8 is a cross-sectional view on the line VIII-VIII shown in FIG. 7;

FIG. 9 is a partial schematic view of the nacelle represented in FIG. 2, equipped with detection means.

DETAILED DESCRIPTION

Figure 1:
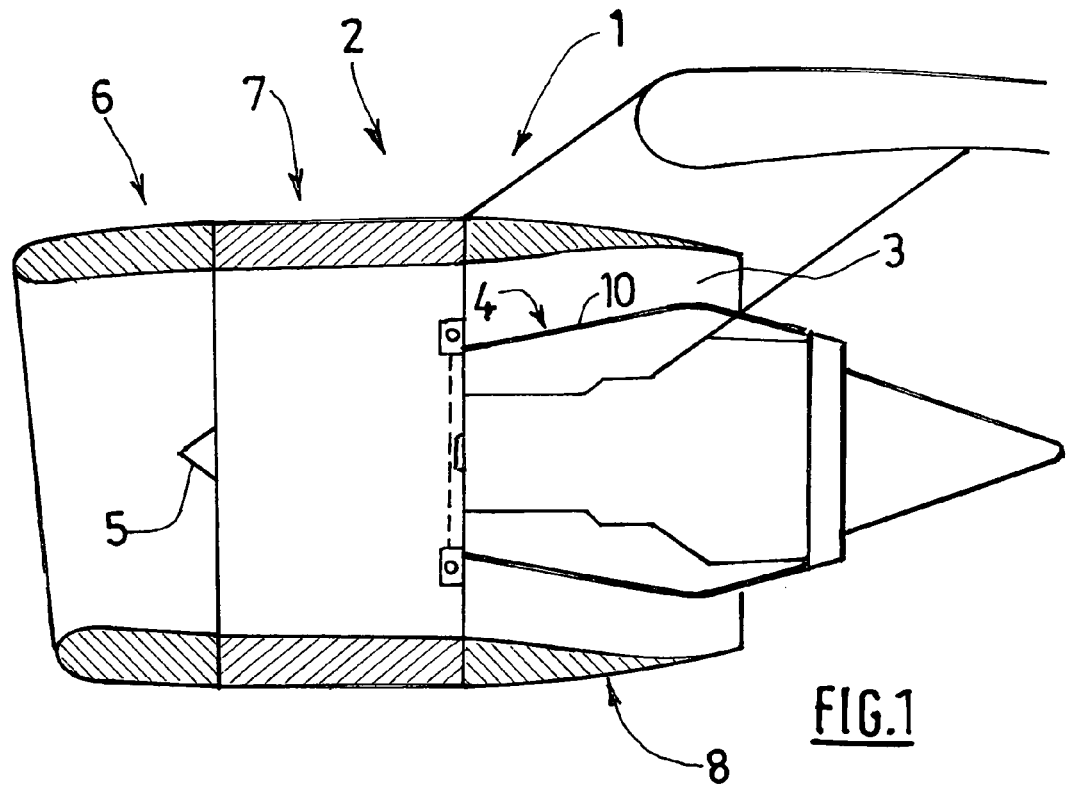
FIG. 1 is a schematic view in longitudinal section of a nacelle according to the invention in the closed state.

A nacelle of an aircraft 1 according to the invention as represented in FIG. 1, comprises in a manner known per se an outer structure 2, termed OFS, which defines an annular flow duct 3 with a concentric inner structure 4, termed IFS surrounding the structure of the jet engine (not shown) to the rear of a fan.

More precisely, this outer structure 2 is broken down into a front air inlet section 6, a mid-section 7 intended to surround the fan 5, and a rear section 8 generally formed by at least two half-shells.

Figure 2:
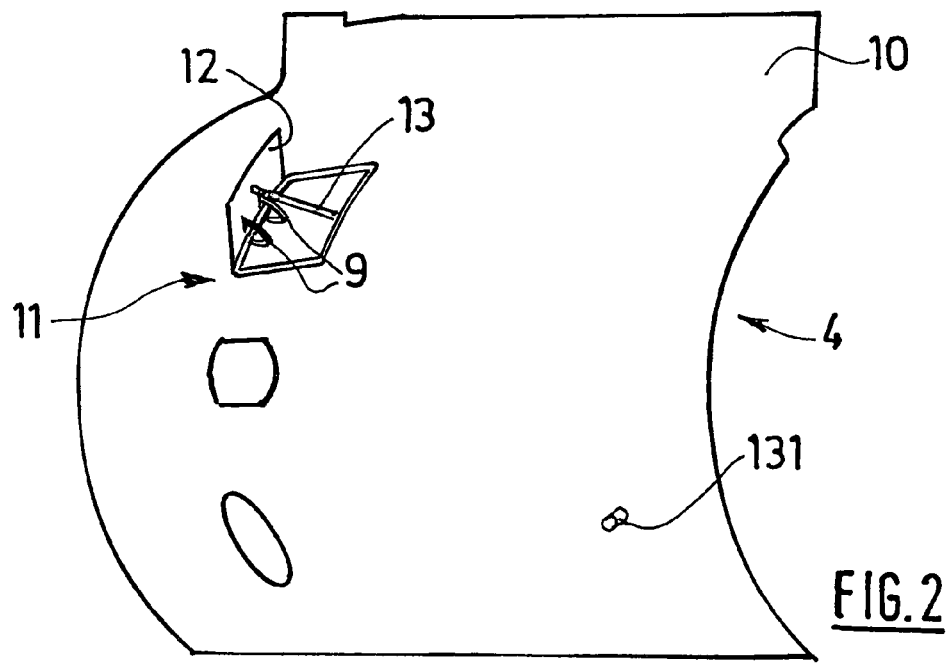
FIGS. 2 and 3 are partial perspective schematic views of the inner panel of a nacelle when an excess pressure flap is deployed.
Figure 3:
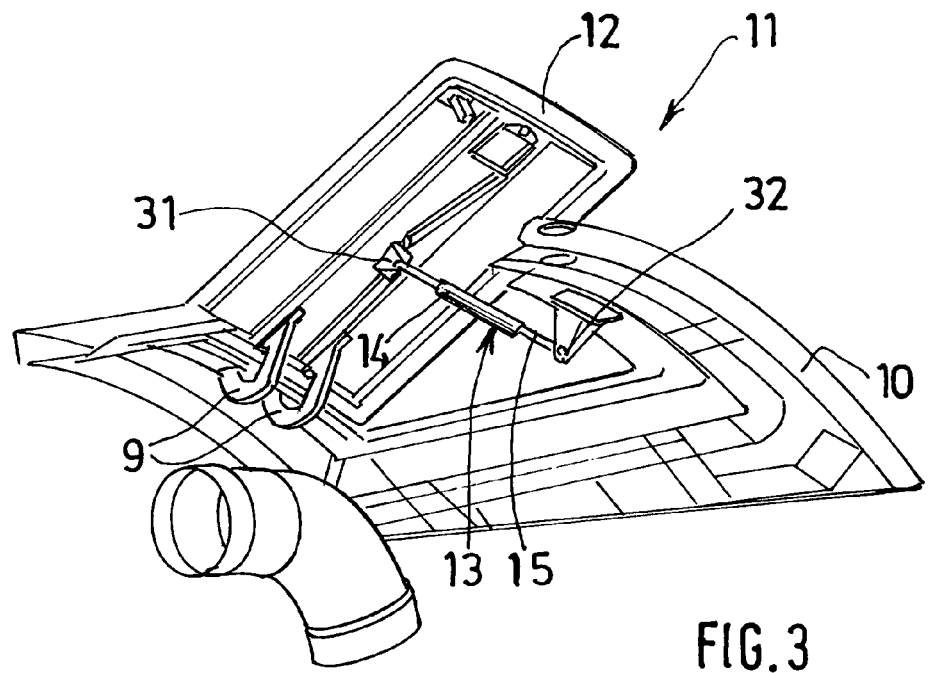
Figure 4:
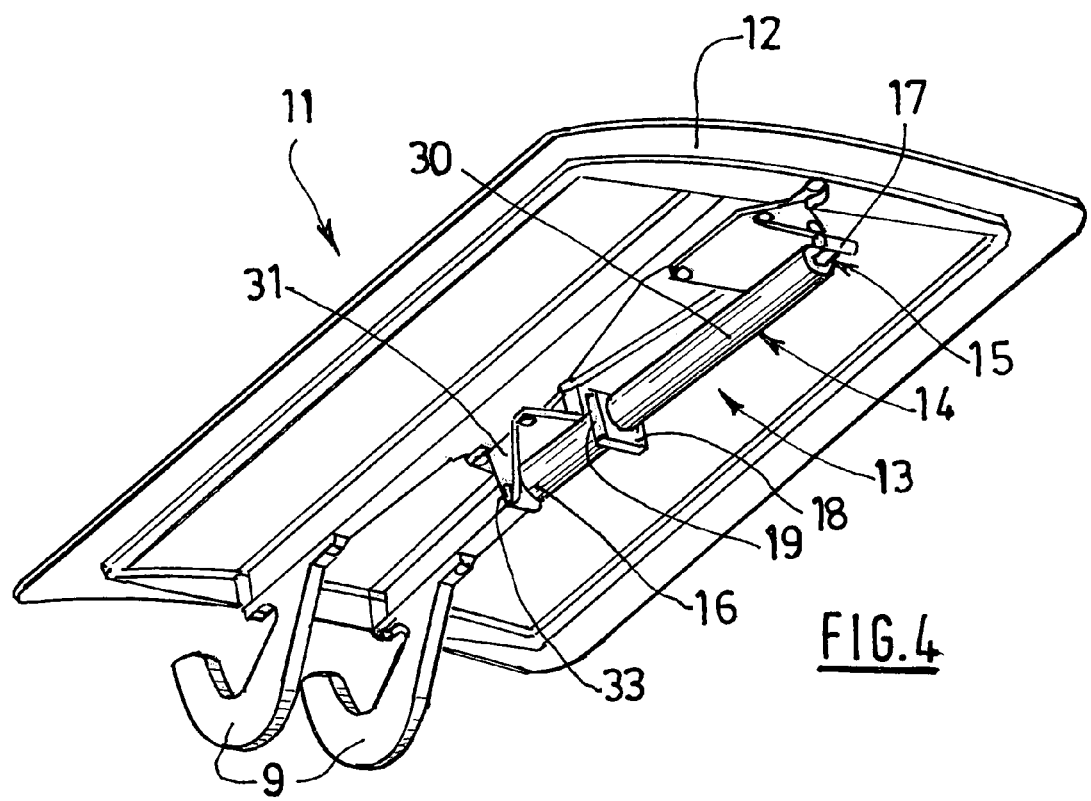
FIG. 4 is a perspective view of the excess pressure flap according to the invention.

The inner structure 4 comprises an inner panel 10 which surrounds a downstream portion of the jet engine. As represented in FIGS. 2 and 3, exhaust means 11 are provided in this inner panel 10 so that any unwanted excess pressure occurring in the jet engine compartment is discharged into the annular duct 3.

These exhaust means 11 are preferably positioned at the front of the inner panel 10 so as to be situated at close as possible to the sensitive regions in which excess pressures may occur due to an explosion in the jet engine compartment. These exhaust means 11 comprise at least one excess pressure flap 12 equipped with a strut 13. The excess pressure flap 12 is attached to the inner panel 10, and is pivotably mounted about the latter via a set of hinges 9.

A nacelle according to the invention is represented more specifically in FIGS. 4 to 8.

The strut 13 of the excess pressure flap 12 comprises a cylindrical hollow casing 14 in which a rod 15 can slide. This casing 14 has an end 16 pivotably mounted about an axis 33 in a fastening plate 31 attached excess pressure flap 12, and the rod 15, extending the casing 14, has an end 17 pivotably mounted in a fastening block 32 attached to the inner panel 10 of the inner structure 4.

More precisely, and as represented in FIGS. 5 to 8, the casing 14 comprises a lateral surface 30 having a U-shaped outer shoulder 18, and an insert 19 which is also U-shaped and is slid into said outer shoulder 18 and held in position by a retention finger 20 housed in the casing 14 and connecting the two free arms 21 of the insert 19. In addition, elastic return means produced in the form of two compression springs 22 arranged transversely relative to the rod 15, and on either side of the latter, are provided between the casing 14 and the insert 19.

In this way, when the excess pressure that has developed in the jet engine compartment exerts sufficient stresses on the excess pressure flap 12 to force the latter to open outwards in such a way as to place the jet engine compartment in free communication with the annular duct 3, the rod 15 is caused to slide inside the casing 14 as represented in FIGS. 7 and 8, in such a way that the rod 15 is no longer between the retention finger 20 and the insert 19. As a result, the compression springs 22 are enabled to relax and thereby force said insert 19 to move away from the outer shoulder 18, the end result of which is to position the retention finger 20 on the path of the rod 15 in the event of rearward movement of the latter.

Therefore, these locking means make it possible to lock the strut 13 in its spacing position which has been designed so as to ensure a minimum discharge flow rate to the outside in the event of an unwanted excess pressure.

This strut 13 will be able, during maintenance operations on the ground, to revert to its retracted position following a manual operation in the course of which the operator will first actuate the insert 19 so that it slides in the outer shoulder 18 of the casing 14, which will cause the retention finger 20 to move translationally outwards and will free up the rearward return passage for the rod 15. Due to gravity, the excess pressure flap 12 will then cause the rod 15 to slide inside the casing 14 until it contacts the excess pressure flap 12 on the inner panel 10. The excess pressure flap 12 will then be in the closed position again, and therefore in alignment with the inner panel 10 of the inner structure 4.

Moreover, detection means 129 are advantageously provided to allow the operator or operators to check instantaneously from the outside whether the exhaust means 11 have been actuated or not in flight.

For that purpose, these detection means 129 comprise a control system whose activation is conditioned by the activation of the exhaust means 11 as represented schematically in FIG. 9.

This control system will advantageously comprise a cam whose pivoting will be controlled by the opening of the excess pressure flap 12. This cam will preferably be connected to a pre-stressed trigger which is connected to transmission means 130 attached to at least one external mechanical display member 131.

More precisely, the pivoting of the cam will cause the release of the pre-stress trigger, which as it is released will exert a pull on the transmission means advantageously produced in the form of a cable 130, this pull causing the deployment of the mechanical member preferably produced in the form of a "pop-out"-type device 131 as represented in the deploy position in FIG. 2.

Although the invention has been described in connection with specific exemplary embodiments, it goes without saying that it is in no way limited thereto and that it comprises all the technical equivalents of the means described as well as the combinations thereof if they come within the scope of the invention.

The invention claimed is:

1. A nacelle for a jet engine, of the type comprising a rear section forming an outer structure which, together with a concentric inner structure comprising an inner panel intended to surround a downstream portion of the jet engine, defines an annular flow duct for a secondary stream, said nacelle comprising:

exhaust means formed in the inner panel and
   at least one excess pressure flap equipped with spacing means for guaranteeing a minimum discharge flow rate to an outside in an event of an untimely excess pressure, said spacing means being produced with the aid of at least one strut equipped with locking means designed to lock said strut in a spacing position in an event of excess pressure requiring opening of the excess pressure flap, wherein the strut comprises a hollow casing in which a rod can slide, said casing having an end fixed in the excess pressure flap and said rod having an end fixed in the inner panel, wherein the casing has a U-shaped outer shoulder, and the locking means are produced with aid of a U-shaped insert which is slid into the outer shoulder and held in position by at least one retention finger housed in the casing and connecting two free arms of said insert.

2. The nacelle as claimed in claim 1, wherein elastic return means are provided between the casing and the insert in such a way as to move said insert away from the outer shoulder when the rod has slid in the casing, thereby forcing the retention finger to position itself on a return path of said rod.

3. The nacelle as claimed in claim 1, wherein the exhaust means are positioned at a front of the inner panel.

4. The nacelle as claimed in claim 1, further comprising detection means designed so as to make actuation of the exhaust means visible from the outside.

5. The nacelle as claimed in claim 4, wherein the detection means comprise a control system whose activation is conditioned by activation of the exhaust means.

6. The nacelle as claimed in claim 5, wherein the control system is connected to at least one external mechanical display member via transmission means.

7. The nacelle as claimed in claim 6, wherein the control system comprises a pre-stressed trigger connected to the transmission means, the release of which is conditioned by actuation of the exhaust means.

8. An aircraft, comprising at least one nacelle as claimed in claim 1.

* * * * *